Nov. 19, 1957 — F. E. BARRETT — 2,813,751
PLASTIC SPRAYING APPARATUS
Filed April 18, 1955 — 2 Sheets-Sheet 1

INVENTOR.
FRANCIS E. BARRETT
BY Fulwider Mattingly & Huntley
Attorneys

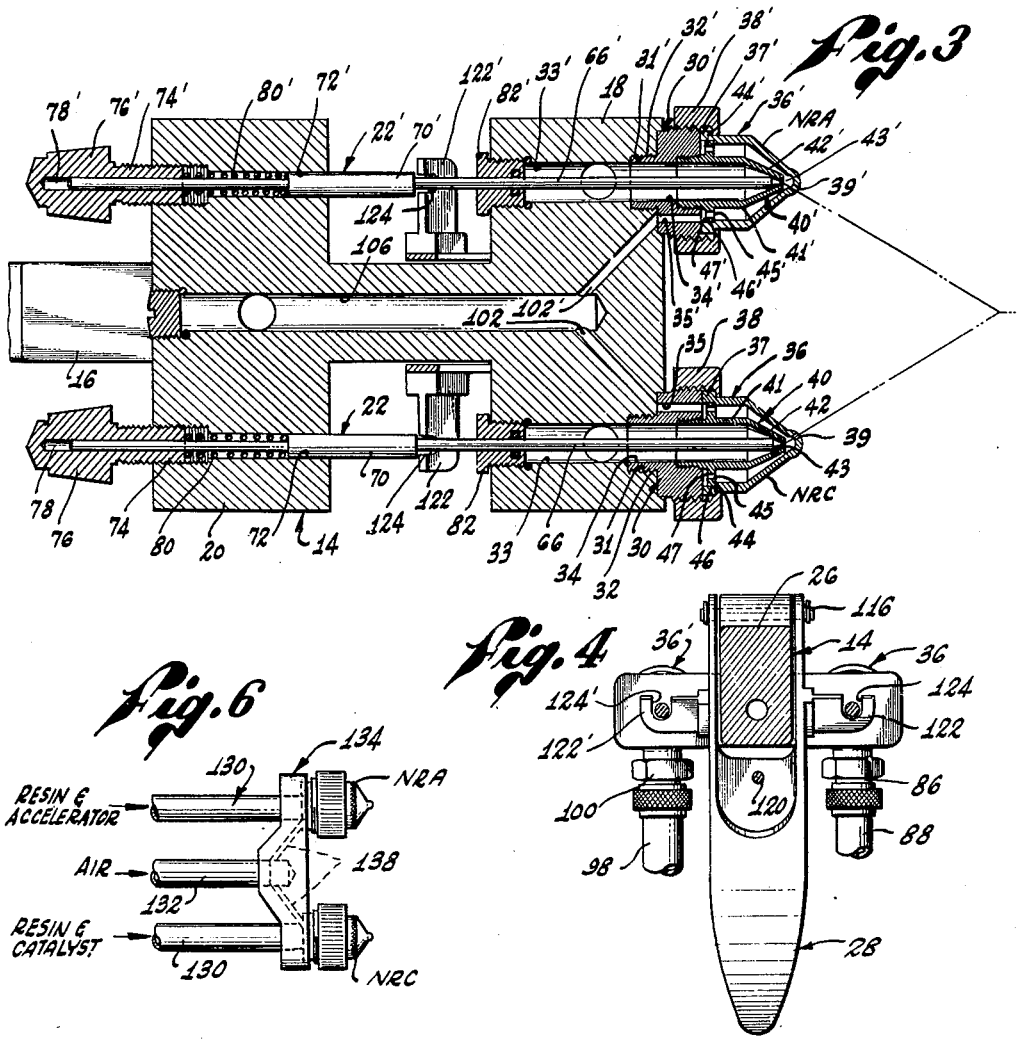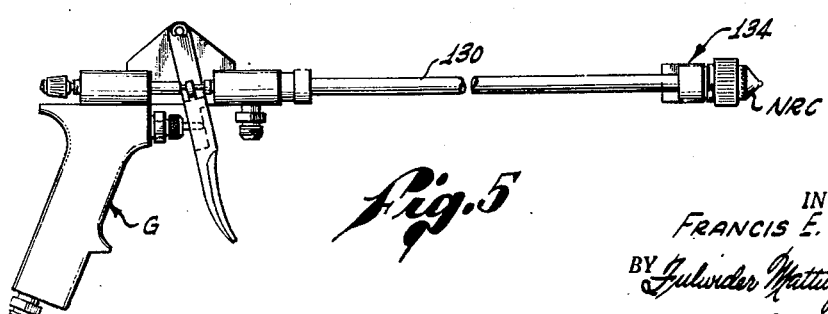

United States Patent Office 2,813,751
Patented Nov. 19, 1957

2,813,751

PLASTIC SPRAYING APPARATUS

Francis E. Barrett, Riverside, Calif., assignor, by mesne assignments, to Sealzit Company of America, a corporation of California Application April 18, 1955, Serial No. 501,760

14 Claims. (Cl. 299—86)

The present invention relates generally to the field of plastics and more particularly to a novel apparatus for spraying liquid plastics.

It has been heretofore proposed to spray various articles with liquid plastics of the polyester resin type so as to form a protective coating. A protective coating of this nature restrains corrosion and other damage resulting from exposure to the atmosphere. Such spraying has proven to be especially beneficial when applied to various metallic articles, such as oil drilling and refining equipment, aircraft and ship components, and military equipment. It has also proven useful in extending the service life of wooden and composition roofing materials. Many other uses for these plastic protective coatings are certain to be forthcoming inasmuch as they are resistant to acids, salt water, petroleum products and weathering.

The spraying of polyester resin type plastics has not yet become widespread, however, primarily because of the difficulty involved in carrying out the spraying operation. Such difficulty results from the fact that it is necessary to add both a chemical catalyst and a chemical accelerator to the liquid resin in order to get the latter to cure at ordinary temperatures within a reasonable period of time. Heretofore such mixing has taken place in a single container from which the resulting solution is then sprayed. The proportions of the polyester resin, the catalyst and the accelerator are determined both by the temperature at which the resulting solution will exist and the air pressure used in the spraying process. Should such temperature or air pressure change appreciably during the spraying process the original proportions will not be correct. Additionally, once the three materials have been mixed together in one container the resulting solution will immediately start curing. This necessitates that the spraying job be completed within a comparatively short period of time. If the spraying operation should be interrupted for more than a minimum amount of time, the spraying equipment may become clogged and require disassembly and cleaning.

The main purpose of the present invention is to overcome the above disadvantages whereby the spraying of liquid polyester resin plastics may come into widespread use. Briefly this purpose is achieved by dividing the polyester resin into two separate solutions, one solution comprising a mixture of polyester resin and a catalyst and the other solution comprising a mixture of polyester resin and an accelerator. The two solutions are simultaneously sprayed upon an object to be coated by means of a unique spray gun having two nozzles, one for the solution of polyester resin and catalyst, and the other for the solution of polyester resin and accelerator.

It is a major object of the present invention to provide a novel and improved apparatus for spraying liquid plastics of the polyester resin type.

Another important object of the present invention is to provide a novel spray gun especially adapted for use with the unique method of the present invention. This gun is simple of design and rugged of construction whereby it may afford a long and useful service life. It is also highly effective in operation and easily controllable even by an unskilled operator.

These and other objects and advantages of the present invention will become more apparent from the following detailed description, when taken in conjunction with the appended drawings, wherein:

Figure 3 is a horizontal sectional view taken on line 3—3 of Figure 2;

Figure 4 is a vertical sectional view taken along line 4—4 of Figure 2;

Figure 5 is a reduced side elevational view of a modified form of said spray gun; and Figure 6 is a fragmentary top plan view showing the nozzle arrangement of the gun of Figure 5.

Figure 1:
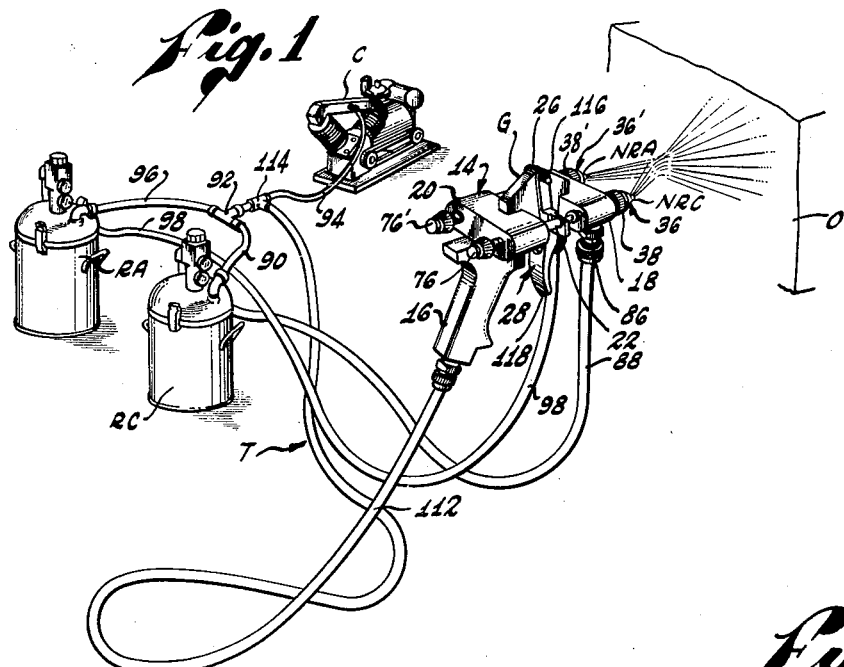
Figure 1 is a perspective view of a preferred form of spraying apparatus which may be utilized in practicing the method of the present invention.

Referring to the drawings and particularly Figure 1 thereof, a preferred form of spraying apparatus embodying the present invention includes a spray gun G having a pair of nozzles NRC and NRA; a source of compressed air such as a conventional electric motor-powered compressor C; and two containers designated RC and RA. The spray gun G and the two containers RC and RA are connected to the compressor C by flexible tubing T in a manner to be fully described hereinafter. The container RC contains a solution of polyester resin and a suitable chemical catalyst while the other container RA contains a solution of polyester resin and a suitable chemical accelerator. These solutions are forced through the nozzles NRC and NRA of the spray gun G so as to converge in an atomized condition at a point spaced forwardly of the gun upon an object to be sprayed O. When the atomized solutions converge in this manner a curing action will commence immediately and accordingly the polyester resin may cure very rapidly upon the object O, the actual rate being proportional to the percentages of catalyst and accelerator utilized in making up the two solutions. Although several types of catalysts are available, it has been determined that methyl ethyl ketone peroxide is very effective. Another catalyst which may be utilized is made up of equal parts of a benzoyl peroxide base and tricresyl phosphate. With regard to a suitable accelerator, either a six percent cobalt or a dimethyl aniline has proven satisfactory. It has been found that the solution of polyester resin and catalyst should contain approximately three quarters to one percent catalyst and that the solution of polyester resin and accelerator should contain approximately one half to one percent accelerator. Other types of catalysts and accelerators utilized in different percentages, however, may also prove satisfactory in carrying out the invention.

With reference to the remaining figures, the spray gun G includes an integral main body, generally designated 14, which may be cast in metal and includes a depending handle or grip 16 at its rear portion. The body 14 is symmetrical about a vertical plane extended through the center of this handle 16. The front portion of the body is formed with a horizontally extending support arm 18 for the two nozzles NRC and NRA, while the rear portion thereof is formed with a similar support arm 20 for a pair of needle valves, generally designated 22 and 22', that cooperate with the two nozzles NRC and NRA, respectively, in controlling the liquid flow therethrough. A mounting bracket 26 for a trigger, generally designated 28, extends upwardly from the center portion of the body 14.

Referring to Figure 3, the nozzles NRC and NRA are identical in construction and they each include a generally cylindrical insert member, generally designated 30, 30' formed at its rear portion with an externally threaded boss 31, 31' of reduced diameter which is screwed into a complementary threaded socket 32, 32' formed at one side of the front of the support arm 18 of body 14. This socket 32 and its counterpart 32' formed in the other side of the support arm 18 are each coaxial with horizontal passages 33 and 33' that extend through the support arm. Each insert member 30, 30' is formed with a coaxial bore 34, 34'. The rear surface of the front portion of the insert members abuts the front end of the support arm 18. An axially extending air passage 35, 35' extends through each of these front portions of the two insert members. The insert members each support a forwardly and inwardly tapering air tip member, generally designated 36, 36' of hollow, frusto-conical configuration. The rear end of these air tip members 36, 36' are formed with an annular lip 37, 37' which are secured in coaxial abutment with the front end of the insert members 30 and 30', respectively, by means of lock rings 38 and 38'. The latter are internally threaded so as to engage complementary external threads formed on the insert members. The front end of each air tip member is coaxially formed with a spray aperture 39 and 39'. A fluid tip member 40, 40' is coaxially disposed within the confines of the air tip members 36 and 36', respectively. Each fluid tip member includes an axially extending barrel element 41, 41' having its major portion positioned within the bores 34 and 34' of the two insert members 30 and 30', respectively. The front end of each barrel 41, 41' merges into a frusto-conical section 42, 42' which terminates at its front end in a coaxial orifice 43, 43'. An annular flange 44, 44' extends radially outwardly from each barrel element rearwardly of the frusto-conical section 42, 42'. The flanges 44 and 44' are each formed with a plurality of air openings 45. The radially outer end of each flange seats within an annular recess 46 formed in each tip member 36 and 36'. With this arrangement a cylindrical air-transfer space 47, 47' is defined between the rear surface of each flange 44, 44' and the front of each insert member 30, 30'. It should be particularly observed that the axes of each of the spray apertures 39 and 39' are inclined towards one another whereby a line drawn along each axis will meet at a point spaced forwardly of the spray gun G on the center line thereof.

The needle valves 22 and 22' are identical in construction and each include an elongated needle element 66, 66' mounted for reciprocal movement along its longitudinal axes. The front of each needle element has a point which is disposed adjacent the orifice 43, 43' of its respective nozzle so as to control the flow of fluid therethrough. The intermediate portion of each needle element includes a collar 70, 70' the rear portion of which is slidably disposed within bores 72, 72' formed within the outer portion of the suport arm 20 of the body 14. The rear portion of each bore 72, 72' is internally threaded so as to receive the externally threaded boss 74, 74' of adjustment knobs 76, 76'. Each adjustment knob 76, 76' is formed with a bore 78, 78' that slidably receives the rear portion of the needle elements 66, 66'. A helical compression spring 80, 80' is interposed between the front end of the bosses 74 and 74' and the rear end of the collars 70 and 70' of the needle elements. The front portion of each needle element is slidably supported within the passage 33, 33' of the support arm 20 by means of a coaxially bored packing gland 82, 82'. The packing glands 82 and 82' are externally threaded so as to be secured within the internally threaded rear ends of the passages 33 and 33', respectively.

The solution of polyester resin and catalyst enters the rear interior of the nozzle NRC by means of the horizontal passage 33 extending rearwardly therefrom. This solution is fed into the intermediate portion of the passage 33 through a suitable fitting 86. This fitting 86 is secured to one end of a length of flexible tubing 88. The other end of this tubing 88 is connected to the container RC. The interior of this container RC is maintained at super atmospheric pressure by means of the compressor C. To this end, a short length of flexible tubing 90 extends from the upper end of the container RC to a T-fitting 92. The center leg of this T-fitting 92 is connected to the compressor C by means of another length of flexible tubing 94. The opposite leg of the T-fitting 92 is connected to another short length of tubing 96 which is connected to the upper end of the other container RA. With this arrangement both containers RC and RA may be maintained at the same pressure. A length of flexible tubing 98 similar to the length of tubing 88 extends from the container RA to a fitting 100. This latter fitting 100 is formed at the intermediate portion of the passage 33'. In this manner the solution of polyester resin and accelerator is introduced into the rear interior of the nozzle NRA.

Figure 2:
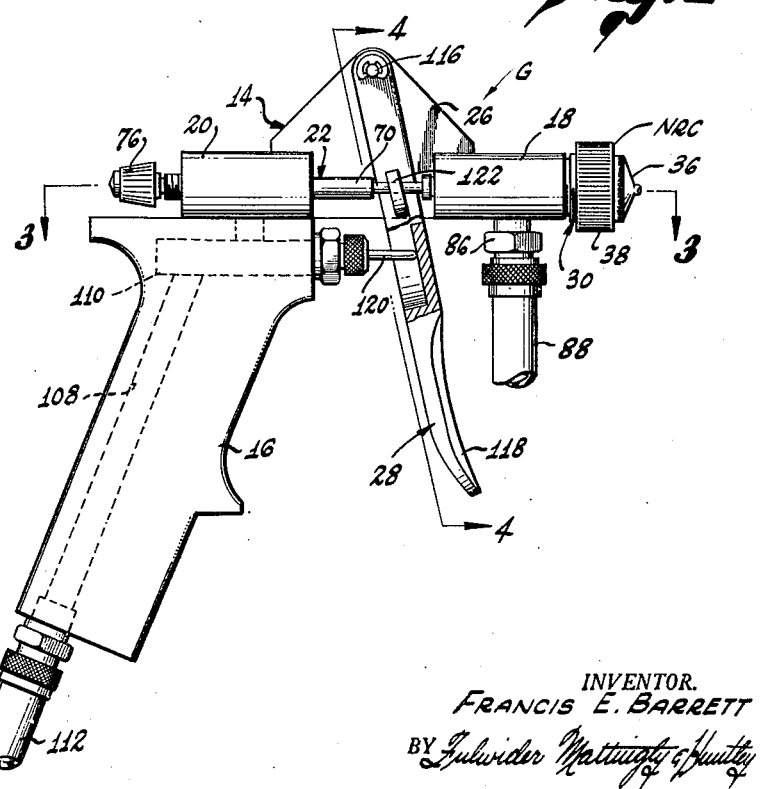
Figure 2 is a side elevational view of the spray gun component of said apparatus, said gun being partly broken away in vertical section.

The air necessary to atomize the polyester resin solution entering the fluid tip elements 40 and 40' of the two nozzles is introduced into the air passages 35, 35' of the insert members 30 and 30' by suitable passage means formed in the body 14. Referring to Figures 2 and 3, the passage means include a pair of inclined passages 102 and 102' which are aligned with the air passages 35 and 35' at their front end. The rear ends of these passages 102 and 102' intersect the front end of a horizontal bore 106 which extends through the mid-portion of the body 14. The latter bore is in communication with a vertically inclined bore 108 formed through the handle 16. A suitable air valve 110 is interposed between the two bores 106 and 108. This air valve 110 is operated by the trigger 28. Air under pressure enters the lower end of the handle bore 108 through a length of flexible tubing 112. The opposite end of this length of tubing 112 is connected to the center leg of a T-fitting 114 having its aligned legs connected to the length of tubing 94 that extends to the compressor C.

The trigger 28 is pivotally connected at its upper end to the upper portion of the mounting bracket 26 by means of a horizontal pin 116. The lower portion of the trigger 28 is formed with a finger grip 118. The intermediate portion of the trigger 28 is adapted to about the front end of a plunger 120 forming a part of the air valve 110. As shown in Figure 4, above the point of contact between the plunger 120 and the trigger, the latter is formed with a pair of outwardly extending ears 122 and 122'. These ears are notched as at 124 and 124' so as to encompass the needle elements 66 and 66'. Referring now to Figure 2, pivotal movement of the trigger 28 rearwardly from its normal position will initially cause the plunger 120 of the air valve 110 to be moved rearwardly. In this manner, a blast of air is directed through the two nozzles NRC and NRA so as to clean them of any foreign matter. Further rearward pivotal movement of the trigger will cause the rear surfaces of the ears 122 and 122' to abut the front end of the collars 70 and 70' of the needle elements 66 and 66'. Continued rearward pivotal movement of the trigger will then effect concurrent rearward movement of the needle elements from their normal position of Figure 3. In this manner, the points of the needle elements will be retracted from within the orifices 43 and 43' of the nozzles and permit the solutions of polyester resin and catalyst, and polyester resin and accelerator to flow through these orifices. These solutions will be atomized by the compressed air flowing through the nozzles and emerge from the appertures 39 and 39' so as to converge at a point ahead of the spray gun substantially coinciding with lines drawn along the axes of these apertures.

It should be noted that the use of the parallel needle valves 22 and 22' permit the use of a simple yet effective actuating mechanism therefor. The amount of trigger pull required to actuate the needle valves may be controlled by manipulation of the adjustment knobs 76 and 76'.

Referring now to Figures 5 and 6, there is shown a modified form of spray gun embodying the present invention. This spray gun is particularly adapted for use in spraying horizontally extending surfaces, such as roofs. It is substantially identical to the preferred form of spray gun described hereinabove except that the nozzles NRC and NRA are held spaced forwardly of the body 14 by means of elongated tubes 130 and 130'. A third tube 132 is centrally mounted between the two tubes 130 and 130' for supplying air to the nozzles. The front end of the three tubes 130, 130' and 132 are secured to a bridging element 134. This bridging element 134 is formed with a pair of suitable threaded sockets for receiving the two nozzles. It is also formed with passage means 138 for conducting air to the nozzles from the center tube 132. With this arrangement, a workman may readily spray a horizontal surface without bending or stooping.

It will be understood that various changes and modifications may be made with respect to the foregoing description without departing from the spirit of the invention or the scope of the following claims.

I claim:

1. Apparatus for coating an object with a plastic of the polyester resin type, comprising: a first container for a solution of polyester resin and a catalyst therefor; a second container for a solution of polyester resin and an accelerator therefor; a source of compressed air; means connecting said source with said containers; a spray gun having a main body; a pair of parallel spaced-apart nozzles disposed at the front of said body, each of said nozzles including a hollow forwardly and inwardly tapering air tip element, and a frusto-conical fluid tip element positioned within said air tip element; a spray aperture formed in the front portion of each of said air tip elements with the axes of said apertures being inclined towards one another; an orifice formed in the front end of each of said fluid tip elements; means for connecting the interior of said tip elements with said source of compressed air; means for connecting the interior of one of said fluid tip elements with said first container; means for connecting the interior of the other of said fluid tip elements with said second container; and, parallel needle valve means carried by said body for controlling the flow of said solutions through said orifices.

2. Apparatus for coating an object with a plastic of the polyester resin type, comprising: a first container for a solution of polyester resin and a catalyst therefor; a second container for a solution of polyester resin and an accelerator therefor; a source of compressed air; means connecting said source with each of said containers; a spray gun having a main body; a pair of parallel spaced-apart nozzles disposed at the front of said body, each of said nozzles including a hollow forwardly and inwardly tapering air tip element, and a frusto-conical fluid tip element positioned within said air tip element; a spray aperture formed in the front portion of each of said air tip elements with the axes of said apertures being inclined towards one another; an orifice formed in the front end of each of said fluid tip elements; means for connecting the interior of said air tip elements with said source of compressed air; means for connecting the interior of one of said fluid tip elements with said first container; means for connecting the interior of the other of said fluid tip elements with said second container; and, trigger means carried by said body for controlling the flow of air and fluid through said nozzles, said trigger means being arranged to release compressed air through said orifices before said solutions are permitted to flow through said spray apertures.

3. Apparatus for coating an object with a plastic of the polyester resin type, comprising: a spray gun having a main body; a spaced-apart pair of parallel horizontal passages formed in said body; a nozzle disposed in the front portion of each of said horizontal passages, each of said nozzles including a hollow, forwardly and inwardly tapering air tip element, and a hollow, forwardly and inwardly tapering fluid tip element coaxially positioned within each of said air tip elements with its interior in communication with one of said horizontal passages; a spray aperture formed in the front portion of each of said air tip elements with the axes of said apertures being inclined towards one another; an orifice coaxially formed in the front end of each of said fluid tip elements; a needle element mounted within and parallel to each of said horizontal passages with its point being movable toward and away from one of said orifices; air passage means formed in said body for connecting the interior of said air tip elements with a source of compressed air; air valve means interposed in said air passage means; means for connecting one of said horizontal passages with a solution of polyester resin and a catalyst therefor; means for connecting the other of said horizontal passages with a solution of polyester resin and an accelerator thereof; and, trigger means on said body for simultaneously actuating said air valve means and said needle elements.

4. Apparatus as set forth in claim 3 where said trigger means is arranged to open said air valve means before the front end of said needle elements are withdrawn from said orifices.

5. Apparatus for coating an object with a plastic of the polyester resin type, comprising: a first container for a solution of polyester resin and a catalyst therefor; a second container for a solution of polyester resin and an accelerator therefor; a source of compressed air; means connecting said source with each of said containers; a spray gun having a main bdoy; a spaced-apart pair of parallel horizontal passages formed in said body; a nozzle disposed in the front portion of each of said horizontal passages, each of said nozzles including a hollow, forwardly and inwardly tapering air tip element, and a hollow, forwardly and inwardly tapering fluid tip element coaxially positioned within each of said air tip elements with its interior in communication with one of said horizontal passages; a spray aperture formed in the front portion of each of said air tip elements with the axes of said apertures being inclined towards one another; a coaxial orifice formed in the front end of each of said fluid tip elements; a needle element mounted within each of said horizontal passages with its pointed front end normally blocking one of said orifices; air passage means formed in said body for connecting the interior of said air tip elements with a source of compressed air; air valve means interposed in said air passage means; means for connecting one of said horizontal passages with said first container; means for connecting the other of said horizontal passages with said second container; and, trigger means carried by said body for first opening said air valve means and subsequently withdrawing the front of said needle elements from within said orifices.

6. Apparatus for coating an object with a plastic of the polyester resin type, comprising: a spray gun having a main body that includes a horizontally extending support arm at its front portion, a similar support arm at its rear portion and a depending grip below said rear support arm; a pair of parallel, horizontal passages formed in said front support arm; a nozzle coaxially disposed in the front portion of each of said horizontal passages, each of said nozzles including a hollow, forwardly and inwardly tapering air tip element, and a hollow, forwardly and inwardly tapering fluid tip element coaxially positioned within each of said air tip elements with its interior in communication with its respective horizontal passage; a spray aperture formed in the front portion of each of said air tip elements with the axes of said apertures being inclined towards one another; a coaxial orifice formed in the front end of each of said fluid tip elements; a pair of parallel, horizontal bores formed in said rear support arm in alignment with said passages; a pair of elongated needle elements, one of said elements having its rear portion disposed within one of said bores and its front portion disposed within the passage forwardly of said bore and the other of said elements being disposed in the other of said bores and passages; spring means in said horizontal bores biasing the front end of said needle elements into said orifices; air passage means formed in said body including a vertically inclined bore through said grip for connecting the interior of said air tip elements with a source of compressed air; an air valve disposed in the upper portion of said grip bore and including a forwardly extending plunger; a collar formed on the intermediate portion of each of said needle elements; a trigger pivotally mounted to said body for forward and rearward relative movement thereto, said trigger including a surface engageable with the front surfaces of said collars; means for connecting one of said horizontal passages with a solution of polyester resin and a catalyst therefor; and means for connecting the other of said horizontal passages with a solution of polyester resin and an accelerator therefor.

7. Apparatus for coating an object with a plastic of the polyester resin type, comprising: a first container for a solution of polyester resin and a catalyst therefor; a second container for a solution of polyester resin and an accelerator therefor; a source of compressed air; conduit means connecting each of said containers with said source; a spray gun having a main body that includes a horizontally extending support arm at its front portion, a similar support arm at its rear portion and a depending grip below said rear support arm; a pair of parallel, horizontal passages formed in said front support arm; a nozzle coaxially disposed in the front portion of each of said horizontal passages; each of said nozzles including a hollow, forward and inwardly tapering air tip element, and a hollow, forwardly and inwardly tapering fluid tip element coaxially positioned within each of said air tip elements with its interior in communication with its respective horizontal passage; a spray aperture formed in the front portion of each of said air tip elements with the axes of said apertures being inclined towards one another; a coaxial orifice formed in the front end of each of said fluid tip elements; a pair of parallel, horizontal bores formed in said rear support arm in alignment with said passages; a pair of elongated needle elements, one of said elements having its rear portion disposed within one of said bores and its front portion disposed within the passage forwardly of said bore and the other of said elements being disposed in the other of said bores and passages; spring means in said horizontal bores biasing the front end of said needle elements into said orifices; air passage means formed in said body from the interior of said air tip elements including a vertically inclined bore through said grip; conduit means connecting said vertically inclined bore with said source of compressed air; an air valve disposed in the upper portion of said vertically inclined bore and including a forwardly extending plunger; a collar formed on the intermediate portion of each of said needle elements; a trigger pivotally mounted to said body for forward and rearward movement relative thereto, said trigger including a surface engageable with the front end of said plunger and a pair of ears engageable with the front surfaces of said collars; conduit means for connecting one of said horizontal passages with said first container; and, conduit means for connecting the other of said passages with said second container.

8. Apparatus as set forth in claim 7 where said trigger engages said plunger before its ears engage said collars.

9. Apparatus for coating an object with a plastic of the polyester resin type, comprising: a spray gun having a main body that includes a horizontally extending support arm at its front portion, a similar support arm at its rear portion and a depending grip below said rear support arm; a pair of parallel, horizontal passages formed in said front support arm; a nozzle coaxially disposed in the front portion of each of said horizontal passages, each of said nozzles including a hollow, forwardly and inwardly tapering air tip element, and a hollow forwardly and inwardly tapering fluid tip element coaxially positioned within each of said air tip elements with its interior in communication with one of said horizontal passages; a spray aperture formed in the front portion of each of said air tip elements with the axes of said apertures being inclined towards one another; a coaxial orifice formed in the front end of each of said fluid tip elements; a pair of parallel, horizontal bores formed in said rear support arm in alignment with said passages; a pair of elongated needle elements, one of said elements having its rear portion disposed within one of said bores and its front portion disposed within the passage forwardly of said bore and the other of said elements being disposed in the other of said bores and passages; compression spring means in said horizontal bores biasing the front end of said needle elements into said orifices; axially adjustable control knobs mounted in the rear of said horizontal bores for varying the effective force of said springs; air passage means formed in said body including a vertically inclined bore through said grip for connecting the interior of said air tip elements with a source of compressed air; an air valve disposed in the upper portion of said axially inclined grip bore and including a forwardly extending plunger; a collar formed on the intermediate portion of each of said needle elements; a trigger pivotally mounted at its upper end to the intermediate portion of said body for forward and rearward movement relative thereto, said trigger including a surface engageable with the front end of said plunger and a pair of ears disposed rearwardly of said surface and engageable with the front ends of said collars; means for connecting one of said horizontal passages with a solution of polyester resin and a catalyst therefor; and means for connecting the other of said horizontal passages with a solution of polyester resin and an accelerator therefor.

10. Apparatus for coating an object with a liquid solution, comprising: a spray gun having a main body that includes a horizontally extending support arm at its front portion, a similar support arm at its rear portion and a depending grip below said rear support arm; a pair of parallel, horizontal passages formed in said front support arm; a nozzle coaxially disposed in the front portion of each of said horizontal passages, each of said nozzles including a hollow, forwardly and inwardly tapering air tip element, and a hollow, forwardly and inwardly tapering fluid tip element coaxially positioned within each of said air tip elements with its interior in communication with its respective horizontal passage; a spray aperture formed in the front portion of each of said air tip elements with the axes of said apertures being inclined towards one another; a coaxial orifice formed in the front end of each of said fluid tip elements; a pair of parallel, horizontal bores formed in said rear support arm in alignment with said passages; a pair of elongated needle elements, one of said elements having its rear portion disposed within one of said bores and its front portion disposed within the passage forwardly of said bore and the other of said elements being disposed in the other of said bores and passages; spring means in said horizontal bores biasing the front end of said needle elements into said orifices; axially adjustable control knobs mounted in the rear of said horizontal bores for varying the effective force of said springs; air passage means formed in said body including a vertically inclined bore through said grip for connecting the interior of said air tip elements with a source of compressed air; an air valve disposed in the upper portion of said grip bore and including a forwardly extending plunger; a collar formed on the intermediate portion of each of said needle elements; a trigger pivotally mounted at its upper end to the intermediate portion of said body for forward and rearward movement relative thereto, said trigger including a surface engageable with the front end of said plunger and a pair of ears disposed rearwardly of said surface and engageable with the front ends of said collars; means for connecting one of said horizontal passages with a first container of said solution; and, means for connecting the other of said horizontal passages with a second container of said solution.

11. Spray gun apparatus, comprising: a spray gun having a main body; a spaced-apart pair of parallel horizontal passages formed in said body; a nozzle disposed in the front portion of each of said horizontal passages, each of said nozzles including a hollow forwardly and inwardly tapering air tip element and a hollow forwardly and inwardly tapering fluid tip element coaxially positioned within each of said air tip elements with its interior in communication with one of said horizontal passages; a spray aperture formed in the front portion of each of said air tip elements with the axes of said apertures being inclined towards one another; an orifice coaxially formed in the front end of each of said fluid tip elements; a needle element mounted within and parallel to each of said horizontal passages with its point being movable towards and away from one of said orifices; air passage means formed in said body for connecting the interior of said air tip elements with a source of compressed air; air valve means interposed in said air passage means; means for connecting one of said horizontal passages with a first solution; means for connecting the other of said horizontal passages with a second solution; and trigger means on said body for simultaneously actuating said air valve means and said needle elements.

12. Apparatus as set forth in claim 11 where said trigger means is arranged to open said air valve means before the front end of said needle elements are withdrawn from said orifices.

13. Spray gun apparatus, comprising: a spray gun having a main body; a spaced-apart pair of parallel horizontal passages formed in said body; a nozzle disposed in the front portion of each of said passages; a spray aperture formed in each of said nozzles with the axes of said apertures being inclined towards one another; means for connecting one of said horizontal passages with a first solution; means for connecting the other of said horizontal passages with a second solution; and means operatively connected to said body for controlling the flow through said passages.

14. A nozzle assembly for use with a spray gun having a main body and a spaced-apart pair of parallel passages formed in said body, comprising: mounting means on said nozzle for securing it within the front portion of one of said passages; a hollow, forwardly and inwardly tapering air tip element formed on said nozzle; a hollow forwardly and inwardly tapering fluid tip element coaxially positioned within said air tip element with its interior in communication with one of said horizontal passages; a spray aperture formed in the front portion of said air tip element with its axis inclined away from the axis of said nozzle and horizontal passage; and an orifice coaxially formed on the front end of said fluid tip element.

References Cited in the file of this patent
UNITED STATES PATENTS

| Re. 20,117 | Power | Sept. 22, 1936 |
| 2,165,099 | Hansen | July 4, 1939 |
| 2,335,116 | Hansen | Nov. 23, 1943 |
| 2,340,243 | Beal | Jan. 25, 1944 |
| 2,370,408 | MacDonald | Feb. 27, 1945 |
| 2,450,503 | Drummond | Oct. 5, 1948 |
| 2,458,220 | Striegel | Jan. 4, 1949 |
| 2,462,262 | Gustafsson | Feb. 22, 1949 |
| 2,511,626 | Einbecker | June 13, 1950 |
| 2,606,072 | Mantle | Aug. 5, 1952 |
| 2,619,386 | Dalrymple | Nov. 25, 1952 |
| 2,631,138 | Dannenberg | Mar. 10, 1953 |
| 2,643,243 | Dannenberg | June 23, 1953 |
| 2,677,626 | Boodle | May 4, 1954 |